UNITED STATES PATENT OFFICE.

MARTIN L. MOWRER, OF DAYTON, OHIO.

PROCESS OF MAKING QUICK-MALT.

SPECIFICATION forming part of Letters Patent No. 461,034, dated October 13, 1891.

Application filed August 21, 1890. Serial No. 362,651. (Specimens.)

*To all whom it may concern.*

Be it known that I, MARTIN L. MOWRER, a citizen of the United States, residing at Dayton, in the county of Montgomery, State of Ohio, have invented a certain new and useful Product as a Substitute for Ordinary Malt and certain new and useful improvements in the process of making the same, of which the following is a full, clear, and exact description.

My invention relates to a new and improved method of converting degerminated grain into a product which contains developed diastase in sufficient quantities to be applicable as a substitute for malt as ordinarily used by brewers and distillers, and to which product I have given the name of "quick-malt," because, while acting as a complete substitute for ordinary malt, it can be manufactured in about one-tenth of the time, and the long delays to brewers and distillers incident to the methods of manufacturing malt where malt is used are entirely done away with.

The ordinary process of malting includes three steps, to wit: steeping, sprouting, and kiln-drying. The grain in the ordinary process is taken in its natural state, deposited in tubs of water of a sufficiently low temperature to prevent souring, and allowed to soak or steep for about forty-eight hours, depending on the character of the grain and the exact temperature of the steeping-water. This steeping thoroughly soaks the grain, starts the germ, and allows the starch globules of the grain to swell, so that they either burst or are ready to burst during the next step in the process. At the end of the steeping process the soaked grain is then spread on the malt-house floor in a layer from twelve to sixteen inches in depth and allowed to sprout. This sprouting developes heat, and during the sprouting, as the temperature rises, the grain is turned over by the maltster from time to time in order to prevent the grain from developing too much heat and consequently souring. The grain is allowed to sprout from three to five days until the sprouts are from three to six inches long, depending on the character and vigor of the grain. By this germination the fatty matter, vegetable oils, and other like constituents of the grain are carried out in the sprout and a chemical change takes place in the grain in the production of the chemical product known as "diastase," the active agent for converting starch into sugar. The third step in the ordinary process consists in kiln-drying this sprouted product from twenty-four to thirty-six hours, during which the product is thoroughly dried and the sprouts become brittle and break off. This finished product is ordinarily malt; but before being used by brewers and the like the malt is cracked between rollers in order to break up the husk and liberate the contents.

In my patent, No. 251,919, of January 3, 1882, I have described a process for the reduction of Indian corn and the separation of the product into different grades, one feature of the process consisting of the removal by mechanical means of the germs and fatty matter of the grain. The process used for removing the germs from corn can and has been applied to barley and other grains, and this grain thus by mechanical means deprived of its germs has become generally known as "degerminated grain." My process of making what I call "quick-malt" consists in soaking this dry degerminated unmalted grain in hot water of a temperature not to exceed 150° Fahrenheit and not less than 100° and at atmospheric pressures a sufficient length of time to swell and develop the starch globules of the grain, then draining the product, allowing the starch globules to swell to bursting, and permitting the development of the active agent of malt—diastase—and then crushing the product between rollers sufficiently to thoroughly break up the starch globules, and then finally drying the product in the usual manner, accomplishing this result in a continuous machine, so that the degerminated and unmalted grain enters the apparatus in a dry state, and is delivered therefrom as a finished marketable substitute for malt in the short space of twenty-four hours.

I prefer to take either barley or corn after the same has been properly degerminated, as described in my patent, No. 251,919, above referred to, or otherwise. The grain thus degerminated is passed into a slow-speed conveyer, which is incased in a water-tight water-pipe, with appropriate boxes at each end to prevent leakage of the water, the water in this pipe to be of a temperature of not less than 100° nor more than 150° Fahrenheit. I prefer to use a spiral or worm wheel conveyer for this purpose, which is arranged to revolve only a fourth of a revolution per minute, and the conveyer is of such a length that the grain shall be sufficiently treated for conversion into soluble malt while passing from one end of the conveyer to the other. The grain remains in this conveyer or automatic heater not less than six hours. From there it is passed into a conveyer with a perforated bottom, where the refuse or water is allowed to drain off, the product passing slowly through this last conveyer at about the same rate of speed as through the first conveyer, so as to permit this drainage, and allow the starch globules to swell to bursting, and to develop the active principle of malt diastase. From the end of this last conveyer the product is spouted to a pair of smooth rolls with a differential speed, where it is crushed sufficiently to burst the starch globules, after which the product is conveyed into a room or chamber heated with hot air of a temperature not exceeding 150° Fahrenheit, where it is deposited upon linen belts, which are slowly moved in any convenient way, and the product properly dried, whence it is delivered to the sacking-bin dry and ready for the market.

It will be seen that by my process in the short space of twenty-four hours I obtain a product which can be used by brewers and distillers in place of ordinary malt, which usually takes from eight to ten days to produce. Taking as I do degerminated grain it is not necessary to steep same forty-eight hours or so and then sprout for three to five days in order to get rid of the fatty matter, vegetable oils, and the like, to swell the starch globules and to develop diastase; but all this is accomplished by soaking in hot water, as described, and then slowly draining the product. Moreover, hot water can be used to soak the grain, as there is no danger of souring the grain already degerminated. When my product has then been crushed and dried, I have what I call "quick-malt" in a dried state ready for use. This product contains diastase in ample quantities for brewers' and distillers' use, although the percentage of disastase is not quite as large as in ordinary malt; but my product is even better than ordinary malt for brewers' and distillers' purposes, for, as a general rule, ordinary malt contains too large a percentage of diastase to produce the best quantities of beer and whisky.

I am aware that grain has been wet in tubs in cold water, and also that grain has been moistened with hot steam and rolls used to curl or flake the same. It is not my desire to simply cook by steam or soak in cold water for the reason that when steam is used upon grain, either whole or broken into hominy, it cooks or hardens the starch, so that it cannot be freely and easily converted into sugar, and at the same time it destroys the diastase needed in the finished malt. If cold water is used in tub-soaking, a part of the grain would be exposed to the atmosphere much longer than the other and an acid would be formed that would destroy the product for the purposes intended.

Having thus fully described my invention, what I claim, and desire to secure by Letters Patent, is—

1. The process of treating unmalted degerminated grain by first soaking same in water of a temperature of not less than 100° nor more than 150° Fahrenheit for sufficient length of time to start the conversion thereof, then draining same about the same length of time to develop the diastase and swell the starch globules to bursting, then crushing and drying same, substantially as and for the purpose described.

2. The process of treating unmalted degerminated grain to convert same into a substitute for malt, which consists of soaking the unmalting degerminated grain in water of a temperature of not less than 100° and not more than 150° Fahrenheit for a period of not less than six hours, then slowly draining same for about the same period, and then crushing the product and drying same in suitable drying-room, substantially as and for the purpose specified.

3. The process of making a substitute for malt from unmalted degerminated grain by detaining the grain in water of sufficient temperature, as described, to convert the product into a soluble substitute for malt before being crushed and dried, and then draining, crushing, and drying the same, substantially as and for the purpose set forth.

MARTIN L. MOWRER.

Witnesses:
OSCAR M. GATTSCHALL,
E. THUDIKE.